Dec. 14, 1954 H. FRENCH 2,697,170
BEAM DEFLECTION CONTROL FOR CATHODE-RAY DEVICES
Filed Nov. 30, 1949
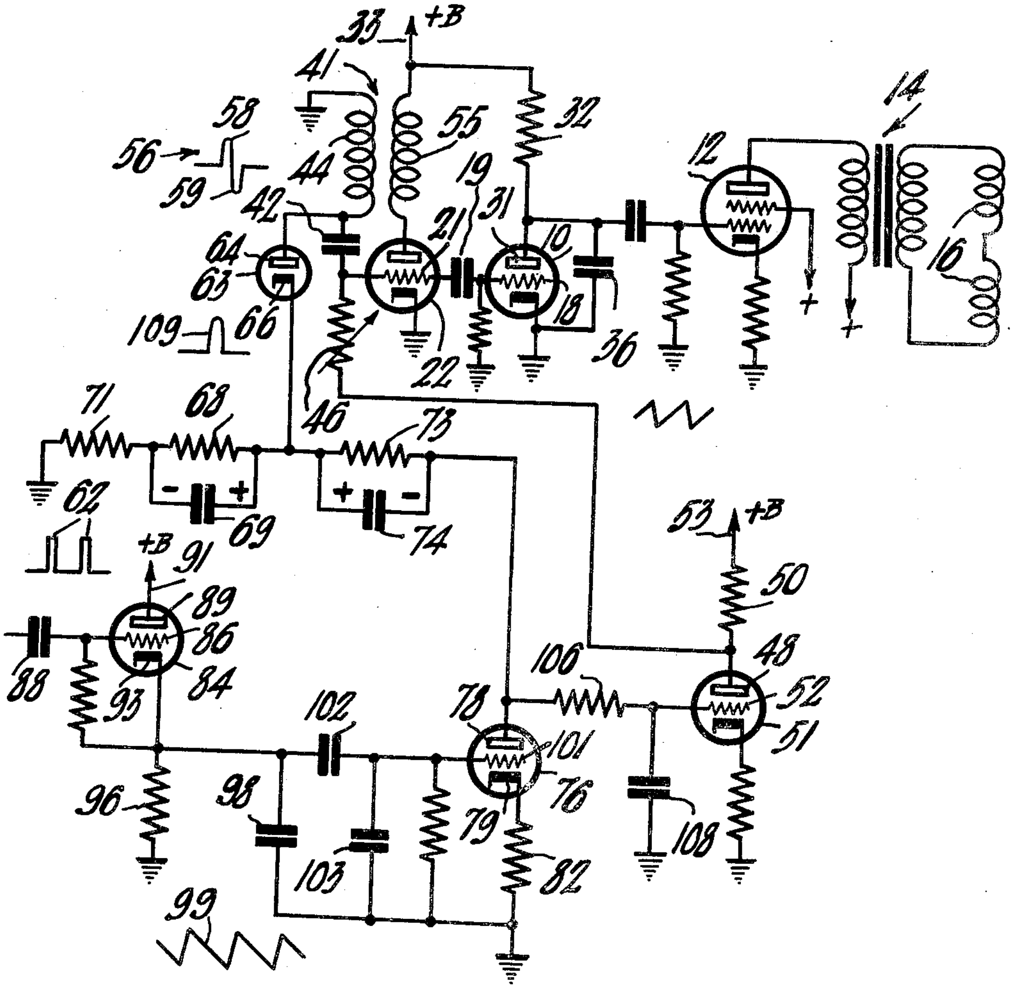
INVENTOR
Hubert French
BY
Chas. J. Mitchell
ATTORNEY 2,697,170

BEAM DEFLECTION CONTROL FOR CATHODE-RAY DEVICES

Hubert French, Brooklyn, N. Y., assignor to Radio Corporation of America, a corporation of Delaware Application November 30, 1949, Serial No. 130,206

The terminal fifteen years of the term of the patent to be granted has been disclaimed 1 Claim. (Cl. 250—36)

The present invention relates to means for controlling deflection of a cathode ray beam, and, more particularly, but not necessarily exclusively, to novel means for synchronizing the scanning deflection in cathode ray beam apparatus, such, for example, as a cathode ray tube, automatically in accordance with a control signal.

In accordance with the invention the novel means referred to include an oscillator which not only provides an output for controlling production of a deflecting voltage of suitable wave form, but, also provides a signal which is utilized in a novel manner to obtain frequency control of the oscillator so that a desired phase relationship is maintained between a series of controlling signals such, for example, as television sync signals, and the oscillator output. In the embodiment described herein, which is selected as being illustrative of the invention in one form, voltage pulses generated by an oscillator, which functions to control deflection of a cathode ray tube for example, are employed in a novel manner to obtain a control voltage for a frequency regulating device. In the illustrative example the frequency regulating device comprises an electron discharge tube which alters the bias on the grid of the oscillator tube. The control signal input in the illustrative embodiment is in the form of a series of pulses which are converted to sawtooth wave form to control conductivity in the discharge path of a phase comparing electron tube. This last named electron tube is included in a circuit branch having a resistor-condenser combination. Another circuit branch, having an identical or similar resistor-condenser combination, is connected effectively in parallel with the first named circuit branch which includes the space discharge tube. The condensers of the resistor-condenser combinations acquire different charges, and the resultant voltage produced thereby has different polarities with respect to the grid of the frequency regulating control tube.

The principal object of the present invention is to provide novel apparatus for controlling the operation of an oscillator in accordance with a series of control signals.

Another object is to provide novel means for obtaining a regulated bias voltage for the grid of a space discharge tube embodied in a relaxation oscillator.

A still further object is to provide a novel system for controlling the repetition rate of signal generation of a discharge tube connected in a blocking oscillator circuit.

Other objects and advantages of the invention will, of course, become apparent and immediately suggest themselves to those skilled in the art to which this invention is directed from a reading of the following specification in connection with the accompanying drawing, the single figure of which shows, diagrammatically, a portion of a television receiver embodying the present invention.

Referring to the drawing there is shown by way of example a deflection circuit for deflecting the cathode ray beam of a cathode ray tube (not shown) in one direction, for example, the horizontal direction. Another similar deflection circuit (not shown) may be employed to produce deflection in another direction substantially at right angles to the first direction thereby to produce a scanned raster in a well known manner. Known deflection wave form generating circuits, generally similar to that shown herein by way of example, are disclosed in U. S. Patent No. 2,101,520, granted December 7, 1937 to W. A. Tolson and Tolson reissue Patent No. Re. 20,338, dated April 30, 1937.

The deflection circuit selected by way of example as a setting for the present invention, although the invention is not limited in use to circuits of this type, comprises a discharge tube 10, a power tube 12, a deflection transformer 14, and deflection coils 16. The coils 16 may be incorporated in a deflection yoke for use with a cathode ray tube (neither shown). It will be understood that a damper tube (not shown) is usually provided for a purpose which is by now well known and may, for example, be of the type disclosed in U. S. patent to Schade No. 2,309,672, granted February 2, 1943, which shows a damper tube in the plate circuit of the scanning output tube. Suitable centering means (not shown), such as are well known in the art, may be incorporated as desired in the circuit which supplies deflection current to the coils 16. Inasmuch as the power tube 12 and the parts so far described are conventional, they need not be described further herein.

The grid 18 of the discharge tube 10 is connected through suitable coupling means, shown as a condenser 19, to the grid 21 of a tube 22 which is provided with circuit connections so that it will serve as a blocking oscillator, as will be described more fully hereinafter. The blocking oscillator circuit is fully described in the Tolson patents referred to above.

The anode 31 of the discharge tube 10 is connected through a charging resistor 32 to a suitable source of positive voltage (not shown) as indicated schematically at 33. The voltage supply source may be the usual B+ or anode supply source generally associated with electronic equipment. A condenser 36 is charged in series with the resistor 32 from the connection 33 when the tube 10 is substantially cut off. A sawtooth of voltage will appear across the condenser 36 since it is discharged periodically by the tube 10 upon occurrence of a positive-going pulse which appears on the grid 21 of the oscillator tube 22.

The blocking oscillator connections referred to above include a transformer 41 which provides an inductive coupling between the grid and plate circuits of the tube 22. It will be understood that the frequency characteristics of the transformer 41 are to be suitable for the deflection frequencies. A blocking capacitor 42 is connected as shown between the grid 21 of the tube 22 and the grid winding 44 of the transformer 41. The grid 21 is also connected through an adjustable resistor 46 to the anode 48 of a tube 51 which functions in accordance with the invention as a frequency regulating device or control tube. The resistance 46 provides an adjustable leakage path to a point of fixed potential for the electrical charge stored in the capacitor 42. This path includes the resistor 50 for the tube 51. The voltage on the control grid 52 of the tube 51 changes in sense and magnitude, as will be hereinafter described more fully. The anode 48 is connected through the resistor 50 to the source of positive voltage (not shown) as indicated at 53, which may be the previously mentioned source. The plate circuit of the tube 22 includes the primary 55 of the transformer 41 and terminates at the previously mentioned positive terminal 33. The free speed of the oscillation which is developed may be regulated by the variable resistor 46 which, in combination with tube 51, varies the rate of discharge of condenser 42. The condenser 42 is periodically charged negatively as the tube 22 operates as a blocking oscillator. Briefly, as the negative bias on the grid 21 of the blocking oscillator tube diminishes, a point is reached when the grid 21 draws a pulse of current and transformer action causes the grid to go positive. When grid current is drawn, the grid 21 is negatively biased and a charge is stored on the condenser 42. The positive condition of the grid is in the form of a pulse. The wave form shown conventionally and which is indicated at 56 includes a positive pulse portion 58 which coincides with conductivity or "firing" of the blocking oscillator. This is followed by a negative pulse portion 59. The wave form 56, it is to be understood, is not necessarily drawn to scale and is an indication, only, of the manner in which the voltage appearing at the ungrounded end of the grid coil 44 is utilized in accordance with the present invention to provide for phase comparison. This comparison is made between a series of pulses 62, which in the illustrative example are considered to be horizontal sync pulses generated or derived in connection with the operation of television apparatus, such for example as a television receiver, and a series of pulses derived from the blocking oscillator.

A suitable unilaterally conducting device, such, for example, as a diode 63 has its anode 64 connected to the ungrounded end of the oscillator grid coil 44. The cathode 66 of the diode is connected so that the diode cathode circuit is divided into two branches. In the illustrative example, one branch comprises a resistor 68 and a condenser 69. A resistor 71 completes the circuit of this branch between ground and the resistor-condenser combination 68 and 69. The other cathode circuit branch for the diode 63 includes a resistor 73 and a condenser 74. The space discharge path of a space discharge tube 76 completes the diode cathode circuit branch including the resistor and condenser combination 73 and 74. The anode 78 of the tube 76 is connected to the resistor-condenser combination 73 and 74 for a purpose to be described. The cathode 79 of the tube 76 is connected to ground by way of a cathode resistor 82.

The standard signal or control pulses 62 are changed to a sawtooth wave of voltage by suitable integrating circuit means. In the illustrative example a tube 84 is employed for this purpose and the pulses 62 are applied upon its grid 86 by way of a coupling condenser 88. The anode 89 of the tube 84 is connected as indicated to a suitable positive direct current source (not shown) by way of a connection indicated schematically at 91. The connections 91 and 33 may be made to a common source as is well known in the art. The cathode 93 of the tube 84 is connected to ground by way of a cathode resistor 96 which is shunted by condenser 98. When the tube 84 conducts upon the occurrence of a pulse 62, the condenser 98 is charged and during intervals between pulses it discharges through the resistor 96, providing a sawtooth of voltage indicated conventionally at 99. This sawtooth of voltage is applied to the grid 101 of the tube 76 by way of a capacity divider including condensers 102 and 103. The capacity divider prevents the sawtooth of voltage from over-driving the grid of the tube 76.

The grid 52 of the previously described control tube is connected to the anode 78 of the tube 76 by a conductive connection including a resistor 106. A condenser 108 is connected between the grid 52 and ground and receives a charge from either the resistor-condenser combination 68—69 or the combination 73—74. The sense of the charge with respect to ground is thus determined and its magnitude is set by the circuit constants. The resulting voltage appearing on the grid 52 is to have a sufficient range to vary the flow of plate current in this tube.

The operation of the illustrative example will now be described. As stated previously the incoming sync pulses 62 are changed into a sawtooth of voltage as indicated at 99. This sawtooth wave is compared with each blocking oscillator pulse generated in operation of the oscillator tube 22. This comparison results in a change in polarity or amplitude of the locally generated D. C. voltage appearing at the grid 52 of the tube 51, this change being in accordance with the deviation of the blocking oscillator frequency, either fast or slow with respect to the sync pulse frequency. When the diode 63 conducts, upon occurrence of the positive pulse portion 58, the resulting rectified pulse 109 causes a current to flow which divides at its cathode and takes one path through the resistor-condenser combination 68 and 69 and the resistor 71 to charge the condenser 69. The polarity of this charge with respect to ground is indicated on the drawing. The other path includes the resistor condenser combination 73 and 74 and the tube 76. Flow of current through this path charges the condenser 74 with the polarity indicated with respect to ground. During the interval between pulses while the opposing charges of the condenser 69 and 74 are leaking off the differential voltage, if there be any, will charge the condenser 108 through the resistor 106. This charge appears on the grid 52 of the tube 51 as a D. C. control voltage. The tube 51 in turn, acting as a D. C. amplifier, causes the D. C. bias on the blocking oscillator to change, depending upon the instantaneous relationship between a sync pulse 62 and the pulse 58 which occurs upon firing of the blocking oscillator 22. The pulse 58, it is to be understood, has a definite and fixed phase relationship with respect to the oscillator pulse which produces operation of the discharge tube 10. There is no deviation in the system of this invention with respect to a phase shift between the pulse 58 and the pulse which controls the discharge tube 10.

The condition will be assumed where the oscillator is operating at a higher than desired frequency. The pulse 58 thus will be early and will lead the sawtooth wave 99 being coincident with a portion on its front or rising slope and is near its negative peak. If the tube 76 were biased to cut off, which is substantially the condition under discussion, the resistance capacity network 68 and 69 would receive all or nearly all of the charge. Hence, during the blocking oscillator pulse interval, the condenser 108 would get its charge from the resistance capacity network 68 and 69 which would be positive with respect to ground. The tube 51 will then draw more plate current and its plate voltage will be reduced, causing the blocking oscillator frequency to be reduced. This comes about by reason of the anode 48 becoming less positive and thus slowing down the rate of discharge of the oscillator grid condenser 42.

The alternate condition would be where the tube 76 would be biased to a maximum value in the less negative direction and be caused to draw more pulsed current. This condition is approached when the oscillator frequency is lower than desired. Assuming low oscillator frequency with the pulse 58 coinciding in time with the positive peak of the sawtooth 99 the grid of the tube 76 is biased to its positive maximum to give maximum current of the tube. The condenser 74 of the resistance-capacity combination 73—74 would then acquire a relatively large charge. The resistor 71 is to have a value such that it is equal to the resistance of the tube 76 when this tube has a grid bias equal to the average or axis value of the sawtooth 99. The desired phase relationship in the system is obtained when the grid is so biased. Stated in another way, the pulse 109 conincides in time with the middle of the rising, or steep, portion of the sawtooth 99. During the blocking oscillator pulse interval the differential voltage would be negative with respect to ground, the resistance capacity network 73 and 74 containing the difference. This in turn would cause the condenser 108 to charge negatively with respect to ground. The tube 51 would then draw less plate current and its plate voltage would increase in the positive direction which would cause the blocking oscillator frequency to increase.

Since the sawtooth of voltage 99 is derived directly from the sync pulses 62 it necessarily bears a definite phase relationship thereto. It then becomes apparent that when synchronism is disturbed the conductivity of the tube 76 changes. Hence the resistance capacity networks 68—69 and 73—74 would produce voltage differentials which change in amplitude and polarity with respect to ground.

An automatic frequency control system embodying the invention will synchronize when the frequency of the control pulses varies over a wide range.

What is claimed is:

A deflecting system comprising a blocking oscillator, a grid biasing condenser forming a part of said oscillator, a space discharge tube having an anode, a cathode and a control electrode, a discharge path for said grid biasing condenser including the anode circuit of said discharge tube, means for obtaining pulses from said oscillator comprising a unilaterally conducting device having an anode and a cathode, said anode being connected to a source of voltage impulses in said oscillator, the cathode circuit for said unilaterally conducting device having two branches, one branch comprising a resistor-condenser combination in series with a resistor, the other branch comprising a resistor-condenser combination in series with the space discharge path of a second space discharge tube, said branches terminating at a voltage reference point for the system, said last named tube having an anode, a cathode and a control electrode, a third space discharge tube, means for applying sync signals on the control electrode of said third space discharge tube, a resistor in the cathode circuit of said third named discharge tube, said cathode circuit terminating at said reference point, a capacitor connected in parallel with said last named resistor whereby to generate a sawtooth of voltage under control of said sync pulses, means to apply said sawtooth of voltage to the control electrode of said second named discharge tube, a condenser connected to the control electrode of said first-named discharge tube and said reference point, and a connection from the anode of said second named discharge tube to the control electrode of the first named discharge tube, said last named condenser receiving its charge from said resistor-condenser combinations acting effectively in series whereby to vary the anode voltage of said first named discharge tube to effect the rate of discharge of said grid biasing condenser of said oscillator.

References Cited in the file of this patent

UNITED STATES PATENTS

| Number | Name | Date |
|---|---|---|
| 2,212,648 | Poch | Aug. 27, 1940 |
| 2,332,681 | Wendt | Oct. 26, 1943 |
| 2,463,685 | Fredendall | Mar. 8, 1949 |
| 2,521,058 | Goldberg | Sept. 5, 1950 |
| 2,540,820 | Gruen | Feb. 6, 1951 |
| 2,566,762 | English | Sept. 4, 1951 |